US007480641B2

(12) United States Patent
Tian et al.

(10) Patent No.: US 7,480,641 B2
(45) Date of Patent: Jan. 20, 2009

(54) METHOD, APPARATUS, MOBILE TERMINAL AND COMPUTER PROGRAM PRODUCT FOR PROVIDING EFFICIENT EVALUATION OF FEATURE TRANSFORMATION

(75) Inventors: Jilei Tian, Tamere (FI); Jani K. Nurminen, Tampere (FI); Victor Popa, Tampere (FI)

(73) Assignee: Nokia Corporation, Espoo (FI)

( * ) Notice: Subject to any disclaimer, the term of this patent is extended or adjusted under 35 U.S.C. 154(b) by 301 days.

(21) Appl. No.: 11/400,629

(22) Filed: Apr. 7, 2006

(65) Prior Publication Data

US 2007/0239634 A1 Oct. 11, 2007

(51) Int. Cl.

| | |
|---|---|
| ***G06E 1/00*** | (2006.01) |
| ***G06E 3/00*** | (2006.01) |
| ***G06F 15/18*** | (2006.01) |
| ***G06G 7/00*** | (2006.01) |
| ***G06N 3/02*** | (2006.01) |

(52) U.S. Cl. ........................................................ 706/15

(58) Field of Classification Search ........................ None
See application file for complete search history.

(56) References Cited

U.S. PATENT DOCUMENTS

| | | | | |
|---|---|---|---|---|
| 6,691,090 | B1 * | 2/2004 | Laurila et al. | 704/250 |
| 6,721,698 | B1 * | 4/2004 | Hariharan et al. | 704/203 |
| 6,977,723 | B2 * | 12/2005 | Lemmo et al. | 356/301 |
| 6,999,925 | B2 * | 2/2006 | Fischer et al. | 704/243 |
| 7,006,969 | B2 * | 2/2006 | Atal | 704/238 |
| 7,008,296 | B2 * | 3/2006 | Swedek et al. | 451/6 |
| 7,039,239 | B2 * | 5/2006 | Loui et al. | 382/225 |
| 7,061,605 | B2 * | 6/2006 | Lemmo et al. | 356/300 |
| 7,120,580 | B2 * | 10/2006 | Rao Gadde et al. | 704/233 |
| 7,133,535 | B2 * | 11/2006 | Huang et al. | 382/100 |
| 7,167,176 | B2 * | 1/2007 | Sloan et al. | 345/426 |
| 7,181,388 | B2 * | 2/2007 | Tian | 704/10 |
| 7,181,402 | B2 * | 2/2007 | Jax et al. | 704/500 |
| 7,209,787 | B2 * | 4/2007 | DiLorenzo | 607/45 |
| 7,215,721 | B2 * | 5/2007 | Hietala et al. | 375/317 |
| 7,216,076 | B2 * | 5/2007 | Atal | 704/238 |
| 7,231,254 | B2 * | 6/2007 | DiLorenzo | 607/45 |
| 7,242,984 | B2 * | 7/2007 | DiLorenzo | 607/45 |
| 7,263,485 | B2 * | 8/2007 | Wark | 704/240 |
| 7,277,758 | B2 * | 10/2007 | DiLorenzo | 607/45 |

(Continued)

OTHER PUBLICATIONS

Voice Conversion Based on Maximum-Likelihood Estimation of Spectral Parameter Trajectory Toda, T.; Black, A.W.; Tokuda, K.; Audio, Speech, and Language Processing, IEEE Transactions on vol. 15, Issue 8, Nov. 2007 pp. 2222-2235 Digital Object Identifier 10.1109/TASL.2007.907344.*

(Continued)

*Primary Examiner*—Michael B Holmes
(74) *Attorney, Agent, or Firm*—Alston & Bird LLP

(57) ABSTRACT

An apparatus for providing efficient evaluation of feature transformation includes a training module and a transformation module. The training module is configured to train a Gaussian mixture model (GMM) using training source data and training target data. The transformation module is in communication with the training module. The transformation module is configured to produce a conversion function in response to the training of the GMM. The training module is further configured to determine a quality of the conversion function prior to use of the conversion function by calculating a trace measurement of the GMM.

36 Claims, 6 Drawing Sheets

U.S. PATENT DOCUMENTS

| | | | | |
|---|---|---|---|---|
| 7,324,851 | B1 * | 1/2008 | DiLorenzo | 607/45 |
| 7,363,278 | B2 * | 4/2008 | Schmelzer et al. | 705/67 |
| 7,369,993 | B1 * | 5/2008 | Atal | 704/243 |
| 7,401,057 | B2 * | 7/2008 | Eder | 706/20 |
| 7,403,820 | B2 * | 7/2008 | DiLorenzo | 607/45 |
| 7,409,343 | B2 * | 8/2008 | Charlet | 704/246 |
| 7,433,490 | B2 * | 10/2008 | Huang et al. | 382/100 |
| 2007/0208566 | A1 * | 9/2007 | En-Najjary et al. | 704/269 |

OTHER PUBLICATIONS

Continuous probabilistic transform for voice conversion Stylianou, Y.; Cappe, O.; Moulines, E.; Speech and Audio Processing, IEEE Transactions on vol. 6, Issue 2, Mar. 1998 pp. 131-142 Digital Object Identifier 10.1109/89.661472.*

A Novel Method for Prosody Prediction in Voice Conversion Helander, E.E.; Nurminen, J.; Acoustics, Speech and Signal Processing, 2007. ICASSP 2007. IEEE International Conference on vol. 4, Apr.15-20, 2007 pp. IV-509-IV-512 Digital Object Identifier 10.1109/ICASSP.2007.366961.*

Nonparallel training for voice conversion based on a parameter adaption approach Mouchtaris, A.; Van der Spiegel, J.; Mueller, P.; Audio, Speech, and Language Processing, IEEE Transactions on vol. 14, Issue 3, May 2006 pp. 952-963 Digital Object Identifier 10.1109/TSA.2005.857790.*

Voice Conversion Using Canonical Correlation Analysis Based on Gaussian Mixture Model ZhiHua Jian; Zhen Yang; Software Engineering, Artificial Intelligence, Networking, and Parallel/Distributed Computing, 2007. SNPD 2007. Eighth ACIS International Conference on vol. 1, Jul. 30, 2007-Aug. 1, 2007 pp. 210-215.*

Voice conversion using Viterbi algorithm based on Gaussian mixture model Jian Zhi-Hua; Yang Zhen; Intelligent Signal Processing and Communication Systems, 2007. ISPACS 2007. International Symposium on Nov. 28, 2007-Dec. 1, 2007 pp. 32-35 Digital Identifier 10.1109/ISPACS.2007.4445816.*

Voice conversion algorithm using phoneme Gaussian mixture model Lv Sheng; Yin Junxun; Huang Jiancheng; Intelligent Multimedia, Video and Speech Processing, 2004. Proceedings of 2004 International Symposium on Oct. 20-22, 2004 pp. 5-8 Digital Object Identifier 10.1109/ISIMP.2004.1433986.*

Voice conversion algorithm based on Gaussian mixture model with dynamic frequency warping of Straight spectrum Toda, T.; Saruwatari, H.; Shikano, K.; Acoustics, Speech, and Signal Processing, 2001. Proceedings. (ICASSP '01). 2001 IEEE International Conference on vol. 2, May 7-11, 2001 pp. 841-844 vol. 2.*

Yannis Stylianou et al.; *Continuous Probabilistic Transform for Voice Conversion* ; IEEE Transactions on Speech and Audio Processing; Date Mar. 1998; pp. 131-142 ; vol. 6, Issue 2.

Alexander Kain et al.;*Spectral Voice Conversion for Text-to-Speech Synthesis*; 1998 Proceedings of the IEEE International Conference onAcoustics, Speech, and Signal Processing; Date May 12-15, 1998; pp. 285-288; vol. 1.

Tiago H. Falk et al.; *Objective Speech Quality Assessment Using Gaussian Mixture Models*; Proceedings of the 22nd Biennial Symposium on Communications; Date May 2004; pp. 169-171.

Taoufik En-Najjary et al.; *Fast GMM-Based Voice Conversion for Text-to-Speech Synthesis Systems*; Interspeech 2004 ICSLP 8th International Conference on Spoken Language Processing; Oct. 4-8, 2004; Jeju Island, Korea.

Vincent Vanhoucke et al.; *Mixtures of Inverse Convariances*; IEEE Transactions on Speech and Audio Processing; May 2004; pp. 250-264; vol. 12; Issue 3.

Jilei Tian et al.; *Efficient Gaussian Mixture Model Evaluation in Voice Conversion*; Interspeech 2006 ICSLP Ninth International Conference on Spoken Language Processing; Sep. 17-21, 2006.

The International Search Report for PCT Application No. PCT/IB2007/000580; Filed Mar. 9, 2007; Date of Completion Oct. 3, 2007; Date of Mailing Oct. 4, 2007.

The Written Opinion for PCT Application No. PCT/IB2007/000580; Filed Mar. 9, 2007; Date of Completion Oct. 3, 2007; Date of Mailing Oct. 4, 2007.

Federico Boccardi, Carlo Drioli; Sound Morphing with Gaussian Mixture Models; Proceedings of the 4th COST G-6 Workshop on Digital Audio Effects (DAFx01); Dec. 6-8, 2001; Limerick, Ireland.

* cited by examiner

METHOD, APPARATUS, MOBILE TERMINAL AND COMPUTER PROGRAM PRODUCT FOR PROVIDING EFFICIENT EVALUATION OF FEATURE TRANSFORMATION

TECHNOLOGICAL FIELD

Embodiments of the present invention relate generally to feature transformation technology and, more particularly, relate to a method, apparatus, and computer program product for providing efficient evaluation of Gaussian Mixture Model (GMM) in the transformation task.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to increase ease of information transfer relates to the delivery of services to a user of a mobile terminal. The services may be in the form of a particular media or communication application desired by the user, such as a music player, a game player, an electronic book, short messages, email, etc. The services may also be in the form of interactive applications in which the user may respond to a network device in order to perform a task or achieve a goal. The services may be provided from a network server or other network device, or even from the mobile terminal such as, for example, a mobile telephone, a mobile television, a mobile gaming system, etc.

In many applications, it is necessary for the user to receive audio information such as oral feedback or instructions from the network. An example of such an application may be paying a bill, ordering a program, receiving driving instructions, etc. Furthermore, in some services, such as audio books, for example, the application is based almost entirely on receiving audio information. It is becoming more common for such audio information to be provided by computer generated voices. Accordingly, the user's experience in using such applications will largely depend on the quality and naturalness of the computer generated voice. As a result, much research and development has gone into improving the quality and naturalness of computer generated voices.

One specific application of such computer generated voices that is of interest is known as text-to-speech (TTS). TTS is the creation of audible speech from computer readable text. TTS is often considered to consist of two stages. First, a computer examines the text to be converted to audible speech to determine specifications for how the text should be pronounced, what syllables to accent, what pitch to use, how fast to deliver the sound, etc. Next, the computer tries to create audio that matches the specifications.

With the development of improved means for delivery of natural sounding and high quality speech via TTS, there has come a desire to further enhance the user's experience when receiving TTS output. Accordingly, one way to improve the user's experience is to deliver the TTS output in a familiar or desirable voice. For example, the user may prefer to hear the TTS output delivered in his or her own voice, or another desirable target voice rather than the source voice of the TTS output. Conversion of speech to some target speech is an example of feature transformation.

In order to provide improved feature transformation, Gaussian mixture model (GMM) based techniques have been found to be efficient in transformation of features that can be represented as scalars or vectors. In GMM based transformation, a combination of source and target vectors is used to estimate GMM parameters for a joint density. Thus, a GMM based conversion function may be created. For example, a set of training data including samples of source and target vectors may be used to train a transformation model. Once trained, the transformation model may be used to produce transformed vectors given input source vectors. Since it is desirable to minimize the mean squared error (MSE) between transformed and target vectors, a set of testing or validation data is used to compare the transformed and target vectors. However, it is often necessary to include large amounts of both training and testing data in order to have an effective transformation. For example, a database may include source and target speech corresponding to a relatively large number of sample sentences in which 60% of the samples are used for training data and 40% of the samples are used for testing data. Accordingly, there may be an increased consumption of resources such as memory and power.

Particularly in mobile environments, increases in memory and power consumption directly affect the size and cost of devices employing such methods. However, even in non-mobile environments, such methods may result in long processing times of algorithms used to train or test the model. Thus, a need exists for providing feature transformation of sufficient quality which can be efficiently employed.

BRIEF SUMMARY

A method, apparatus and computer program product are therefore provided that provide for efficient evaluation in feature transformation. In particular, a GMM evaluation method, apparatus and computer program product are provided that eliminate any requirement for testing or verification data by providing a mechanism for evaluating quality of a transformation model, and therefore transformation performance of the transformation model, during the training of the transformation model. Accordingly, testing or verification data may be reduced or eliminated and corresponding resource consumption may also be reduced.

In one exemplary embodiment, a method of providing efficient evaluation in feature transformation is provided. The method includes training a Gaussian mixture model (GMM) using training source data and training target data, producing a conversion function in response to the training, and determining a quality of the conversion function prior to use of the conversion function by calculating a trace measurement of the GMM.

In another exemplary embodiment, a computer program product for providing efficient evaluation in feature transformation is provided. The computer program product includes at least one computer-readable storage medium having computer-readable program code portions stored therein. The computer-readable program code portions include first, second and third executable portions. The first executable portion is for training a Gaussian mixture model (GMM) using training source data and training target data. The second executable portion is for producing a conversion function in response to the training. The third executable portion is for determining a quality of the conversion function prior to use of the conversion function by calculating a trace measurement of the GMM.

In another exemplary embodiment, an apparatus for providing efficient evaluation in feature transformation is provided. The apparatus includes a training module and a transformation module. The training module is configured to train a Gaussian mixture model (GMM) using training source data and training target data. The transformation module is in communication with the training module. The transformation module is configured to produce a conversion function in response to the training of the GMM. The training module is further configured to determine a quality of the conversion function prior to use of the conversion function by calculating a trace measurement of the GMM.

In another exemplary embodiment, a mobile terminal for providing efficient evaluation in feature transformation is provided. The mobile terminal includes includes a training module and a transformation module. The training module is configured to train a Gaussian mixture model (GMM) using training source data and training target data. The transformation module is in communication with the training module. The transformation module is configured to produce a conversion function in response to the training of the GMM and to convert source data input into target data output using the GMM. The training module is further configured to determine a quality of the conversion function prior to use of the conversion function by calculating a trace measurement of the GMM.

In another exemplary embodiment, an apparatus for providing efficient evaluation in feature transformation is provided. The apparatus includes a means for training a Gaussian mixture model (GMM) using training source data and training target data, a means for producing a conversion function in response to the training, and a means for determining a quality of the conversion function prior to use of the conversion function by calculating a trace measurement of the GMM.

Embodiments of the invention may provide a method, apparatus and computer program product for advantageous employment in a TTS system or any other feature transformation environment. As a result, for example, mobile terminal users may enjoy an ability to customize TTS output voices heard by use of speech conversion.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Figure 1:
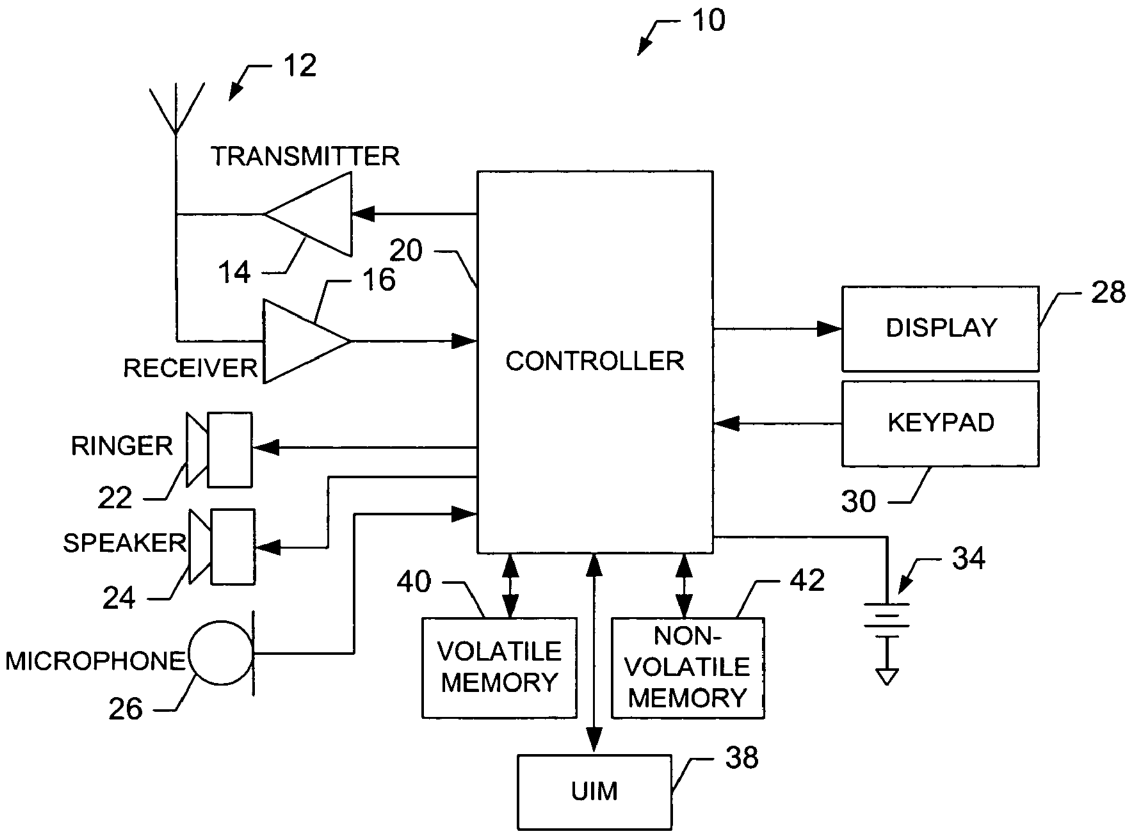
FIG. 1 is a schematic block diagram of a mobile terminal according to an exemplary embodiment of the present invention.

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a block diagram of a mobile terminal 10 that would benefit from embodiments of the present invention. It should be understood, however, that a mobile telephone as illustrated and hereinafter described is merely illustrative of one type of mobile terminal that would benefit from embodiments of the present invention and, therefore, should not be taken to limit the scope of embodiments of the present invention. While several embodiments of the mobile terminal 10 are illustrated and will be hereinafter described for purposes of example, other types of mobile terminals, such as portable digital assistants (PDAs), pagers, mobile televisions, laptop computers and other types of voice and text communications systems, can readily employ embodiments of the present invention.

In addition, while several embodiments of the method of the present invention are performed or used by a mobile terminal 10, the method may be employed by other than a mobile terminal. Moreover, the system and method of embodiments of the present invention will be primarily described in conjunction with mobile communications applications. It should be understood, however, that the system and method of embodiments of the present invention can be utilized in conjunction with a variety of other applications, both in the mobile communications industries and outside of the mobile communications industries.

The mobile terminal 10 includes an antenna 12 in operable communication with a transmitter 14 and a receiver 16. The mobile terminal 10 further includes a controller 20 or other processing element that provides signals to and receives signals from the transmitter 14 and receiver 16, respectively. The signals include signaling information in accordance with the air interface standard of the applicable cellular system, and also user speech and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second and/or third-generation communication protocols or the like. For example, the mobile terminal 10 may be capable of operating in accordance with second-generation (2G) wireless communication protocols IS-136 (TDMA), GSM, and IS-95 (CDMA), or with third-generation (3G) wireless communication protocols, such as UMTS, CDMA2000, and TD-SCDMA.

It is understood that the controller 20 includes circuitry required for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content, according to a Wireless Application Protocol (WAP), for example. Also, for example, the controller 20 may be capable of operating a software application capable of analyzing text and selecting music appropriate to the text. The music may be stored on the mobile terminal 10 or accessed as Web content.

The mobile terminal 10 also comprises a user interface including an output device such as a conventional earphone or speaker 24, a ringer 22, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and other keys used for operating the mobile terminal 10. Alternatively, the keypad 30 may include a conventional QWERTY keypad arrangement. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a universal identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an EEPROM, flash memory or the like, such as that available from the SanDisk Corporation of Sunnyvale, Calif., or Lexar Media Inc. of Fremont, Calif. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10.

Figure 2:
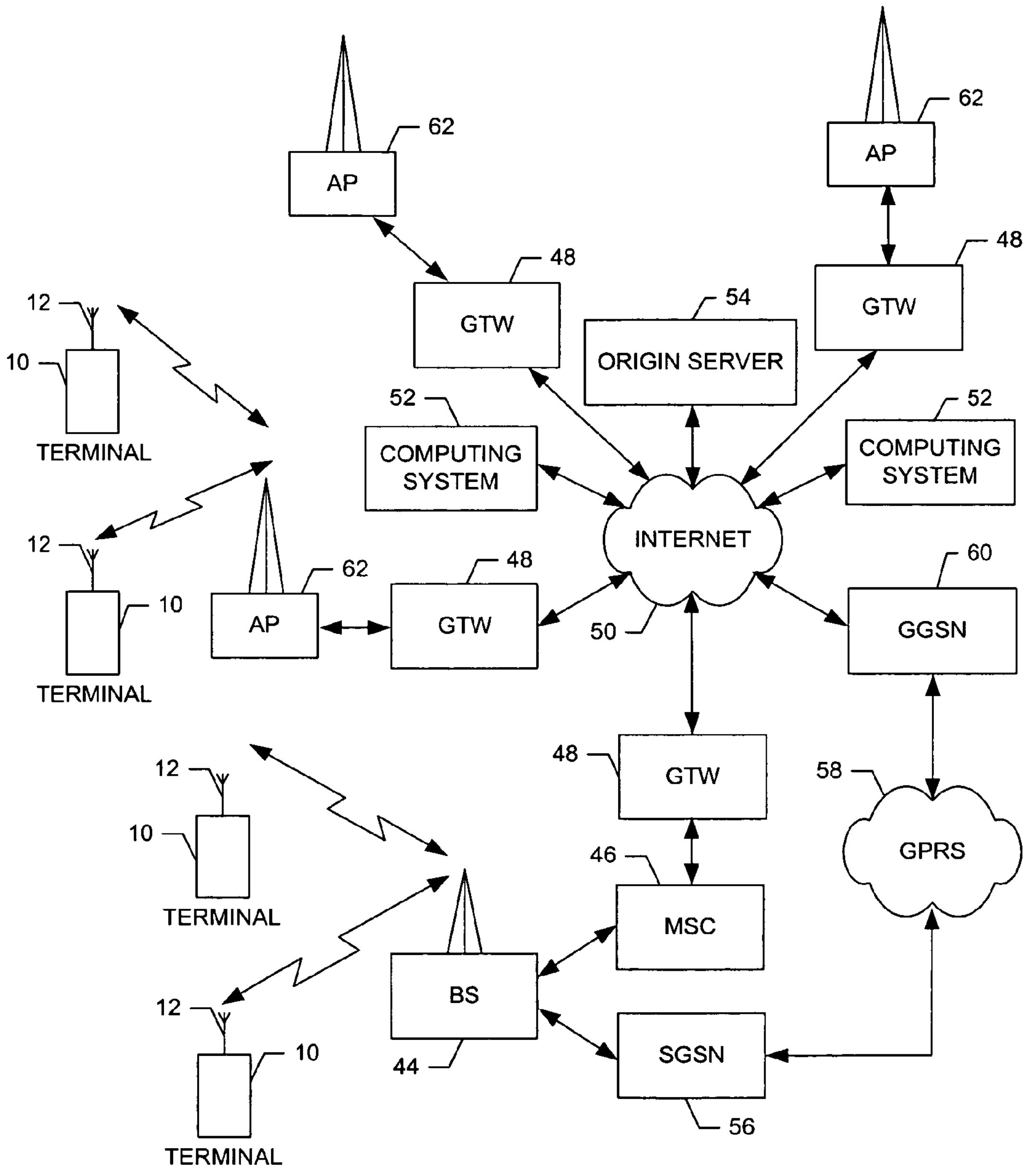
FIG. 2 is a schematic block diagram of a wireless communications system according to an exemplary embodiment of the present invention.

Referring now to FIG. 2, an illustration of one type of system that would benefit from embodiments of the present invention is provided. The system includes a plurality of network devices. As shown, one or more mobile terminals 10 may each include an antenna 12 for transmitting signals to and for receiving signals from a base site or base station (BS) 44. The base station 44 may be a part of one or more cellular or mobile networks each of which includes elements required to operate the network, such as a mobile switching center (MSC) 46. As well known to those skilled in the art, the mobile network may also be referred to as a Base Station/MSC/Interworking function (BMI). In operation, the MSC 46 is capable of routing calls to and from the mobile terminal 10 when the mobile terminal 10 is making and receiving calls. The MSC 46 can also provide a connection to landline trunks when the mobile terminal 10 is involved in a call. In addition, the MSC 46 can be capable of controlling the forwarding of messages to and from the mobile terminal 10, and can also control the forwarding of messages for the mobile terminal 10 to and from a messaging center. It should be noted that although the MSC 46 is shown in the system of FIG. 2, the MSC 46 is merely an exemplary network device and embodiments of the present invention are not limited to use in a network employing an MSC.

The MSC 46 can be coupled to a data network, such as a local area network (LAN), a metropolitan area network (MAN), and/or a wide area network (WAN). The MSC 46 can be directly coupled to the data network. In one typical embodiment, however, the MSC 46 is coupled to a GTW 48, and the GTW 48 is coupled to a WAN, such as the Internet 50. In turn, devices such as processing elements (e.g., personal computers, server computers or the like) can be coupled to the mobile terminal 10 via the Internet 50. For example, as explained below, the processing elements can include one or more processing elements associated with a computing system 52 (two shown in FIG. 2), origin server 54 (one shown in FIG. 2) or the like, as described below.

The BS 44 can also be coupled to a signaling GPRS (General Packet Radio Service) support node (SGSN) 56. As known to those skilled in the art, the SGSN 56 is typically capable of performing functions similar to the MSC 46 for packet switched services. The SGSN 56, like the MSC 46, can be coupled to a data network, such as the Internet 50. The SGSN 56 can be directly coupled to the data network. In a more typical embodiment, however, the SGSN 56 is coupled to a packet-switched core network, such as a GPRS core network 58. The packet-switched core network is then coupled to another GTW 48, such as a GTW GPRS support node (GGSN) 60, and the GGSN 60 is coupled to the Internet 50. In addition to the GGSN 60, the packet-switched core network can also be coupled to a GTW 48. Also, the GGSN 60 can be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, etc.) to the Internet 50, the mobile terminals 10 may communicate with the other devices and with one another, such as according to the Hypertext Transfer Protocol (HTTP), to thereby carry out various functions of the mobile terminals 10.

Although not every element of every possible mobile network is shown and described herein, it should be appreciated that the mobile terminal 10 may be coupled to one or more of any of a number of different networks through the BS 44. In this regard, the network(s) can be capable of supporting communication in accordance with any one or more of a number of first-generation (1G), second-generation (2G), 2.5G and/or third-generation (3G) mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones).

The mobile terminal 10 can further be coupled to one or more wireless access points (APs) 62. The APs 62 may comprise access points configured to communicate with the mobile terminal 10 in accordance with techniques such as, for example, radio frequency (RF), Bluetooth (BT), infrared (IrDA) or any of a number of different wireless networking techniques, including wireless LAN (WLAN) techniques such as IEEE 802.11 (e.g., 802.11a, 802.11b, 802.11 g, 802.11 n, etc.), WiMAX techniques such as IEEE 802.16, and/or ultra wideband (UWB) techniques such as IEEE 802.15 or the like. The APs 62 may be coupled to the Internet 50. Like with the MSC 46, the APs 62 can be directly coupled to the Internet 50. In one embodiment, however, the APs 62 are indirectly coupled to the Internet 50 via a GTW 48. Furthermore, in one embodiment, the BS 44 may be considered as another AP 62. As will be appreciated, by directly or indirectly connecting the mobile terminals 10 and the computing system 52, the origin server 54, and/or any of a number of other devices, to the Internet 50, the mobile terminals 10 can communicate with one another, the computing system, etc., to thereby carry out various functions of the mobile terminals 10, such as to transmit data, content or the like to, and/or receive content, data or the like from, the computing system 52. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Although not shown in FIG. 2, in addition to or in lieu of coupling the mobile terminal 10 to computing systems 52 across the Internet 50, the mobile terminal 10 and computing system 52 may be coupled to one another and communicate in accordance with, for example, RF, BT, IrDA or any of a number of different wireline or wireless communication techniques, including LAN, WLAN, WiMAX and/or UWB techniques. One or more of the computing systems 52 can additionally, or alternatively, include a removable memory capable of storing content, which can thereafter be transferred to the mobile terminal 10. Further, the mobile terminal 10 can be coupled to one or more electronic devices, such as printers, digital projectors and/or other multimedia capturing, producing and/or storing devices (e.g., other terminals). Like with the computing systems 52, the mobile terminal 10 may be configured to communicate with the portable electronic devices in accordance with techniques such as, for example, RF, BT, IrDA or any of a number of different wireline or wireless communication techniques, including USB, LAN, WLAN, WiMAX and/or UWB techniques.

Figure 3:
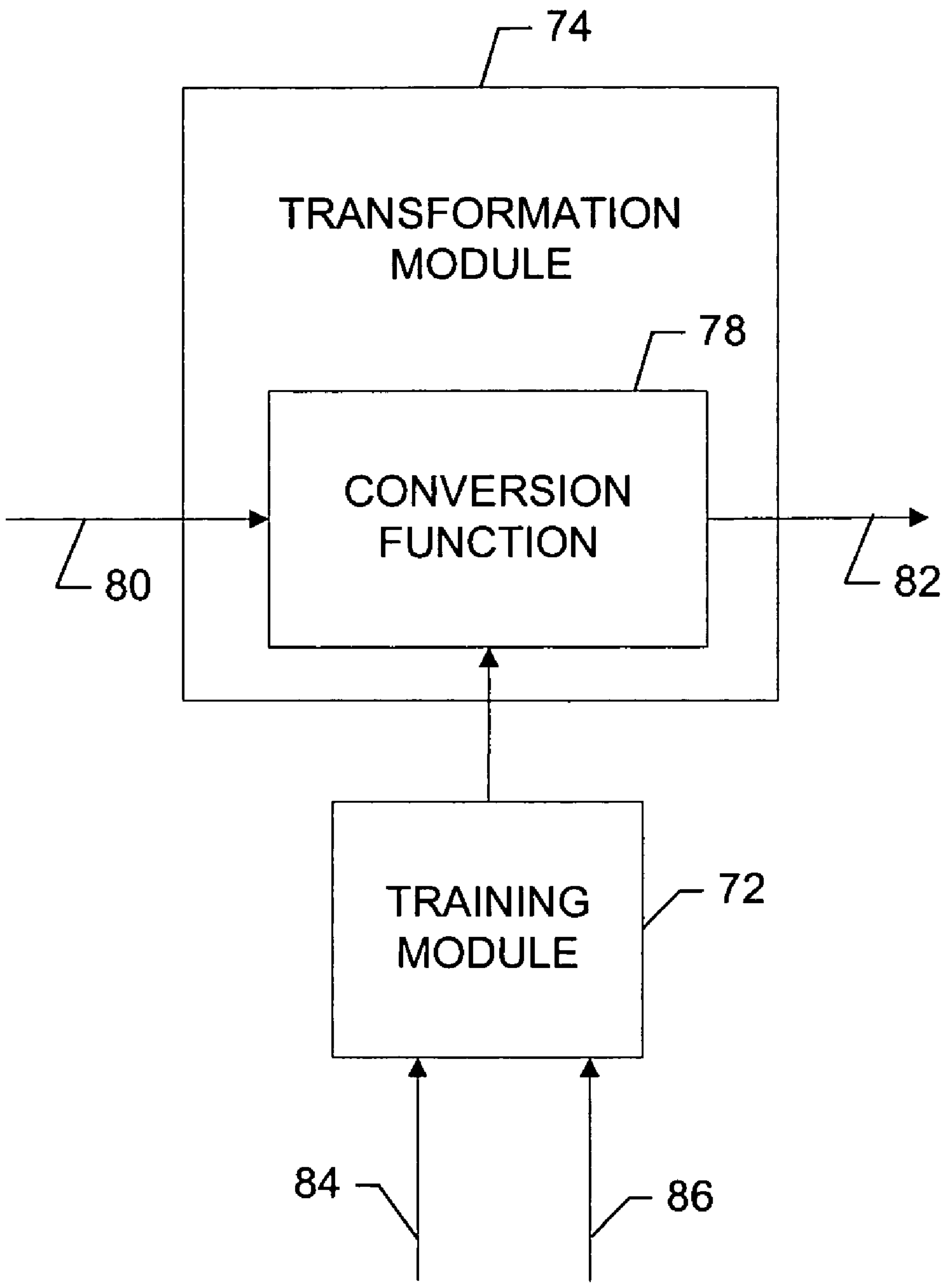
FIG. 3 illustrates a block diagram of portions of a device for providing efficient evaluation of feature transformation according to an exemplary embodiment of the present invention.

An exemplary embodiment of the invention will now be described with reference to FIG. 3, in which certain elements of a system for providing efficient evaluation in feature transformation are displayed. The system of FIG. 3 may be employed, for example, on the mobile terminal 10 of FIG. 1. However, it should be noted that the system of FIG. 3, may also be employed on a variety of other devices, both mobile and fixed, and therefore, embodiments of the present invention should not be limited to application on devices such as the mobile terminal 10 of FIG. 1. It should also be noted, however, that while FIG. 3 illustrates one example of a configuration of a system for providing efficient evaluation in feature transformation, numerous other configurations may also be used to implement embodiments of the present invention. Furthermore, although FIG. 3 will be described in the context of a text-to-speech (TTS) conversion to illustrate an exemplary embodiment in which speech conversion using Gaussian Mixture Models (GMMs) is practiced, the present invention need not necessarily be practiced in the context of TTS, but instead applies more generally to feature transformation. Thus, embodiments of the present invention may also be practiced in other exemplary applications such as, for example, in the context of voice or sound generation in gaming devices, voice conversion in chatting or other applications in which it is desirable to hide the identity of the speaker, translation applications, etc.

Referring now to FIG. 3, a system for providing efficient evaluation in feature transformation is provided. The system includes a training module 72 and a transformation module 74. Each of the training module 72 and the transformation module 74 may be any device or means embodied in either hardware, software, or a combination of hardware and software capable of performing the respective functions associated with each of the corresponding modules as described below. In an exemplary embodiment, the training module 72 and the transformation module 74 are embodied in software as instructions that are stored on a memory of the mobile terminal 10 and executed by the controller 20. It should be noted that although FIG. 3 illustrates the training module 72 as being a separate element from the transformation module 74, the training module 72 and the transformation module 74 may also be collocated or embodied in a single module or device capable of performing the functions of both the training module 72 and the transformation module 74. Additionally, as stated above, embodiments of the present invention are not limited to TTS applications. Accordingly, any device or means capable of producing a data input for transformation, conversion, compression, etc., including, but not limited to, data inputs associated with the exemplary applications listed above are envisioned as providing a data source such as source speech 80 for the system of FIG. 3. According to the present exemplary embodiment, a TTS element capable of producing synthesized speech from computer text may provide the source speech 80. The source speech 80 may then be communicated to the transformation module 74.

The transformation module 74 is capable of transforming the source speech 80 into target speech 82. In this regard, the transformation module 74 may be employed to build a transformation model which is essentially a trained GMM for transforming the source speech 80 into target speech 82. In order to produce the transformation model, a GMM is trained using training source speech data 84 and training target speech data 86 to determine a conversion function 78, which may then be used to transform source speech 80 into target speech 82.

In order to understand the conversion function 78, some background information is provided. A probability density function (PDF) of a GMM distributed random variable z can be estimated from a sequence of z samples $[z_1\ z_2 \ldots z_t \ldots z_p]$ provided that a dataset is long enough as determined by one skilled in the art, by use of classical algorithms such as, for example, expectation maximization (EM). In a particular case when $z=[x^T\ y^T]^T$ is a joint variable, the distribution of z can serve for probabilistic mapping between the variables x and y. Thus, in an exemplary voice conversion application, x and y may correspond to similar features from a source and target speaker, respectively. For example, x and y may correspond to a line spectral frequency (LSF) extracted from the given short segment of the speeches of the source and target speaker, respectively.

The distribution of z may be modeled by GMM as in Equation (1).

$$P(z) = P(x, y) = \sum_{l=1}^{L} c_l \cdot N(z, \mu_l, Z_l) \tag{1}$$

where $c_1$ is the prior probability of z for the component l $$\left(\sum_{l=1}^{L} c_l = 1 \text{ and } c_l \geq 0\right),$$

L denotes a number of mixtures, and $N(z, \mu_l, \Sigma_l)$ denotes Gaussian distribution with a mean $\mu_l$ and a covariance matrix $\Sigma_l$. Parameters of the GMM can be estimated using the EM algorithm. For the actual transformation, what is desired is a function F(.) such that the transformed $F(x_t)$ best matches the target $y_t$ for all data in a training set. The conversion function that converts source feature $x_t$ to target feature $y_t$ is given by Equation (2).

$$F(x_t) = E(y_t|x_t) = \sum_{l=1}^{L} p_l(x_t) \cdot (\mu_l^y + \Sigma_l^{yx}(\Sigma_l^{xx})^{-1}(x_t - \mu_l^x)) \tag{2}$$

$$p_i(x_t) = \frac{c_i \cdot N(x_t, \mu_i^x, \Sigma_i^{xx})}{\sum_{l=1}^{L} c_l \cdot N(x_t, \mu_l^x, \Sigma_l^{xx})}$$

Weighting terms $p_i(x_t)$ are chosen to be the conditional probabilities that the source feature vector $x_t$ belongs to the different components.

In order to perform a transformation at the transformation module 74, a GMM such as that given by Equation (1) is initially trained by the training module 72. In this regard, the training module 72 receives training data including the training source speech data 84 and the training target speech data 86. In an exemplary embodiment, the training data may be representative of, for example, audio corresponding to a predetermined number of sentences spoken by a source voice and a corresponding one of each of the predetermined number of sentences spoken by a target voice which may be stored, for example, in a database. In an exemplary embodiment, the training target speech data 86 may be acquired by prompting a user to input the target voice speaking sentences corresponding to stored passages recorded in the source voice. In other words, the mobile terminal 10 may execute a training program during which the user is asked to repeat certain pre-recorded sentences which were recorded in the source voice. Thus, when the user repeats the sentences in the user's target voice, the training data may be acquired.

The training module 72 iteratively processes the training data to construct the transformation model. In essence, the training module 72 uses the training source speech data 84 and the training target speech data 86 to find the conversion function 78 that provides a relatively high quality transformation from the training source speech data 84 to the training target speech data 86. Then, once the training module 72 determines the transformation model, the transformation module 74 may employ the conversion function 78 to provide the target speech 82 as an output in response to any input of the source speech 80. In other words, when the conversion function 78 is determined, the transformation module 74 may be considered to be "trained" to convert from any source speech input to a corresponding target speech output.

As stated above, the training module 72 seeks to provide a relatively high quality transformation. In previous methods, a determination as to a quality level of a transformation was made using testing or validation data. As briefly described above, a MSE for the conversion (or conversion error) could be calculated to determine a difference or distance between target speech data used for testing and converted speech derived from the conversion of source speech data used for testing. In other words, according to previous methods, training data was used to attain a conversion function. Then the conversion function could be validated by performing conversions on testing data that could be used to determine a quality level of the conversion. Accordingly, memory had to be devoted to both training and testing data and processing could lead to multiple iterations of training and testing evolutions until an appropriate conversion function results. The difference or distance between target speech data used for testing and converted speech derived from the conversion of source speech data used for testing was desired to be a minimum value. Equation (3) gives an equation for the difference (D), in which optimization of parameters of the GMM are achieved when D is minimized.

$$D = \frac{1}{n} \cdot \sum_{t=1}^{n} \|y_t - F(x_t)\|^2 \tag{3}$$

Exemplary embodiments of the present invention allow for reduction of or elimination of the testing data by measuring a quality or trace measure of the GMM during the training phase of the GMM. According to an exemplary embodiment of the present invention, another approach for estimating the conversion error can be derived from data/model statistics using the variance of the distribution of y given x, i.e. $\epsilon(x)=\text{var}(y|x)$. $\epsilon(x)$ can be regarded as a measure of the uncertainty of the mapping. Generally speaking, the narrower $\epsilon(x)$ is, the more accurate the conversion is likely to be. This idea relates directly to equation (3) and is a good substitute for quality assessment. Thus, in theory the quality of the GMM can be measured using equation (4) which calculates the trace measure Q.

$$Q=\int \epsilon(x) \cdot p(x) \cdot dx. \tag{4}$$

In practice, estimation of model quality involves taking each different mixture of variables into account. Accordingly, a calculation must be performed for each mixture. Thus, equation (4) can be computationally complex to calculate. However, in order to decrease the computational complexity the approximation of equation (5) may be substituted for equation (4).

$$Q \approx \sum_{l=1}^{L} w_l \cdot tr(\Sigma_l^{yy}) \tag{5}$$

In equation (5), tr(.) denotes the trace of the matrix and $w_l$ is the weight for the lth component. Thus, the trace measure Q may be calculated more simply and quickly so that the trace measure can be used for evaluation of GMM performance in an efficient manner.

The GMM may also be applied, for example, on DCT (discrete cosine transform) domain features. A de-correlation tendency of DCT-ed features ensures an almost diagonal covariance matrix, thereby making the trace measure of equation (5) more accurate. In any case, however, the GMM model performs better when the trace measure (Q value) decreases in the comparable manner. Since the trace measure can be computed very efficiently and the measurement can be done directly on the transformation model itself without any validation data, the trace measure can be used, for example, for guiding the training module 72 toward better modeling. For example, during training, there may be several iterations of applying training set data and calculating a corresponding Q value for the resulting conversion function 78.

In one exemplary embodiment of the present invention, after each iteration of applying the training set data and calculating the corresponding Q value of the resulting conversion function 78, the corresponding Q value or the change of Q value may be compared to a threshold. For example, a change in the Q value or some other termination criterion based on the trace measurement may be used. In an exemplary embodiment, if the Q value is below the threshold, then the resulting conversion function 78 may be considered likely to produce a transformation from source speech to target speech of acceptable quality. Thus, if the Q value is below the threshold, further iterations of applying the training data to achieve a conversion function are not required and the current resulting transformation model is used. Meanwhile, if the Q value is above the threshold, further iterations of applying the training data may be performed, the transformation model may be modified, different training data may be acquired or any of numerous other modifications to the conversion function 78 may be undertaken in an effort to improve the Q value for subsequent operations. The threshold may be a trace value at or below which the quality of the transformation model is acceptable. The threshold may have a value that varies under numerous conditions. For example, the value of the threshold may depend on, for example, the number of mixtures, the range of data, known statistical properties of data the number of dimensions, etc.

In an alternative exemplary embodiment, several iterations of applying the training set and calculating a corresponding Q value for a resultant conversion function may be performed. However, in this alternative embodiment, each of the Q values may be compared to each other and the resulting conversion function associated with the lowest Q value may be selected for use.

Since the trace measure can be calculated very efficiently, embodiments of the present invention are advantageous for use in embedded applications in which computational or memory resources are limited. However, embodiments of the present invention may also be advantageously applied in applications for which computational resources are not limited, since embodiments of the present invention may decrease a number of iterations necessary to produce a transformation model of acceptable quality.

Using an exemplary embodiment of the present invention in the context of voice conversion, practical results were achieved in studies of pitch and line spectral frequency (LSF) parameters, which are important in speech perception. In a test case, parallel utterances for two speakers (one male and one female) were used for training (90 sentences) and testing (99 sentences). The models were trained using the EM algorithm.

Figure 4:
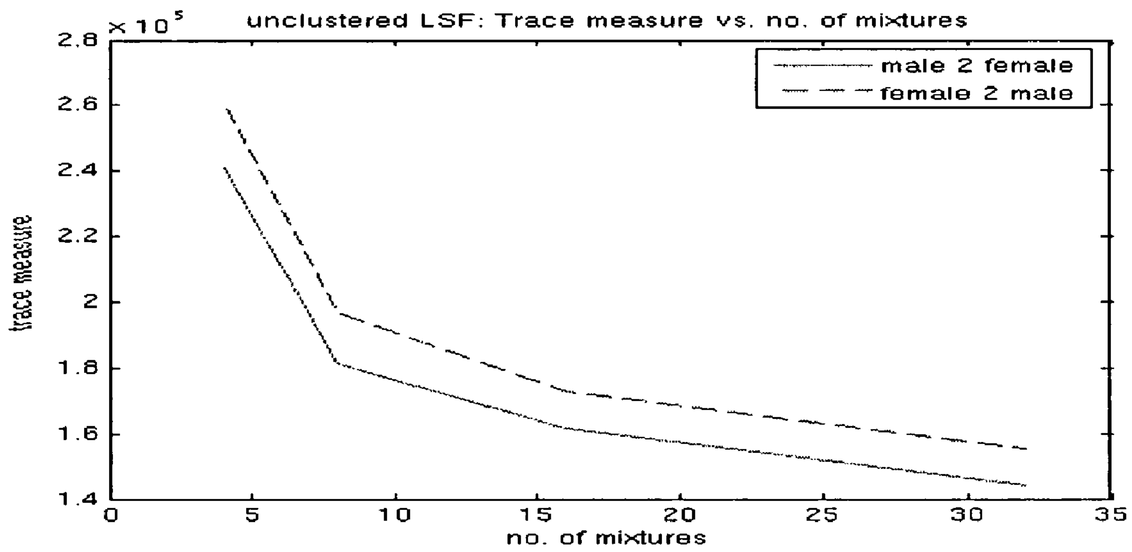
FIG. 4 illustrates trace measure calculation data gathered in a first experiment employing an exemplary embodiment of the present invention.
Figure 5:
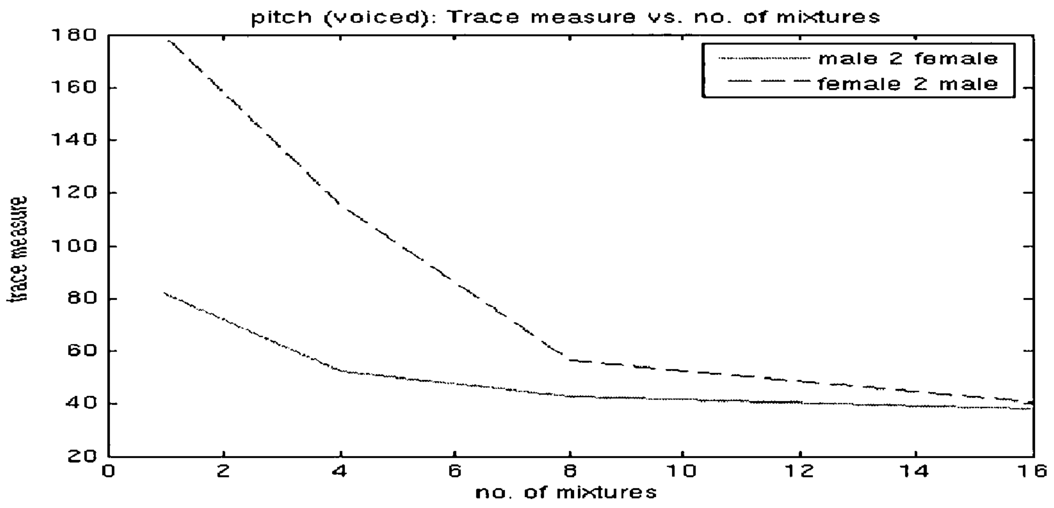
FIG. 5 illustrates trace measure calculation data gathered in a first experiment employing an exemplary embodiment of the present invention.

FIGS. 4 and 5 show data gathered in a first experiment employing an exemplary embodiment of the present invention. The first experiment was conducted to verify that the trace measurement can meaningfully evaluate different models having different numbers of mixtures. FIGS. 4 and 5 show that, in this exemplary embodiment, a rate of decrease in the Q value begins to taper off after about 8 mixtures. However, the computational load increases as the number of mixtures increases. Accordingly, a suitable number of fixtures for LSF and pitch may be selected to be between 8 and 16 mixtures in order to give a good tradeoff between a relatively low Q value (i.e., high quality transformation) and a relatively low computational load.

A second experiment was also conducted to compare trace measurement with the conventional testing mechanism employing MSE. In the second experiment, pitch and LSF parameters were again evaluated. Training was done on normalized data (i.e., the features were first scaled and DCT-ed). Table 1 shows GMM performance evaluated using MSE in accordance with conventional techniques. Accordingly, training and testing were performed for male-to-female conversion and female-to-male conversion. Table 1 shows that male-to-female conversion has better quality (smaller errors) than female-to-male conversion. Table 1 also shows that for the data used in this experiment, the LSF model 1 outperforms the LSF model 2. Meanwhile, table 2 shows GMM performance evaluated using trace measurements in accordance with equation (5). As seen in table 2, male-to-female conversion has better quality (smaller errors) than female-to-male conversion and the LSF model 1 outperforms the LSF model 2. Accordingly, the same conclusions can be drawn regarding quality of models by examining either table 1 or table 2. Thus, for relatively less computational complexity and without any testing data requirement, the trace measurement can be considered an effective and efficient measure of GMM quality and performance in a transformation task.

TABLE 1

GMM performance evaluated using MSE (normalized features).

| | | Female to MALE | Male to FEMALE |
|---|---|---|---|
| Test set | Pitch (voiced) | 212 | 95 |
| | LSF model 1 | 17438 | 16515 |
| | LSF model 2 | 18213 | 16931 |
| Train set | Pitch (voiced) | 224 | 91 |
| | LSF model 1 | 17199 | 16234 |
| | LSF model 2 | 18050 | 17054 |

TABLE 2

| GMM performance evaluated using trace (normalized features). | Female to MALE | Male to FEMALE |
|---|---|---|
| Pitch (voiced) | 0.785 | 0.473 |
| LSF model 1 | 4.764 | 4.609 |
| LSF model 2 | 5.029 | 4.886 |

Figure 6:
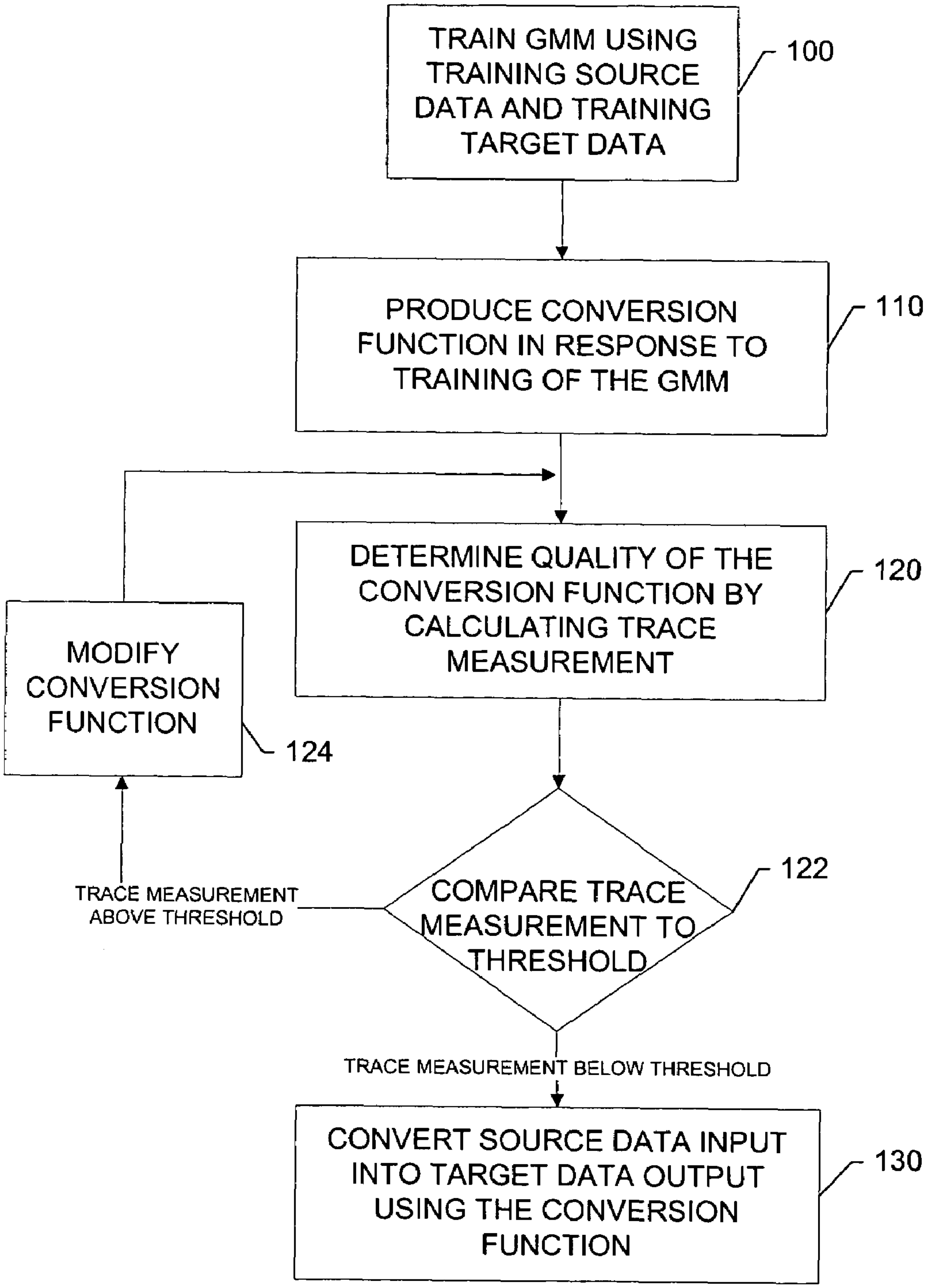
FIG. 6 is a block diagram according to an exemplary method for providing efficient evaluation of feature transformation according to an exemplary embodiment of the present invention.

FIG. 6 is a flowchart of a system, method and program product according to exemplary embodiments of the invention. It will be understood that each block or step of the flowcharts, and combinations of blocks in the flowcharts, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of the mobile terminal and executed by a built-in processor in the mobile terminal. As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

In this regard, one embodiment of a method of providing efficient evaluation of feature transformation includes training a Gaussian mixture model (GMM) using training source data and training target data at operation 100. At operation 110, a conversion function is produced in response to the training of the GMM. At operation 120, a quality of the conversion function is determined prior to use of the conversion function by calculating a trace measurement of the GMM. Operations 122 and 124 below may be optionally performed. The trace measurement may be compared to a threshold during training at operation 122. If the trace measurement is above the threshold, the conversion function may be modified at operation 124. If the trace measurement is below the threshold, then source data input may be converted into target data output using the conversion function at operation 130. Except using trace measure for improving GMM training, trace measure can be used in all cases where the evaluation of the GMM models are needed. Training the GMM may be accomplished using training source voice data and training target voice data. Additionally, the training target voice data may be acquired to correspond to previously recorded training source voice data. In addition, it could be possible to also acquire new training source voice data, i.e. the training source voice data need not be previously recorded. Furthermore, in an exemplary embodiment, the target data may be prerecorded and the source data acquired right before training.

The above described functions may be carried out in many ways. For example, any suitable means for carrying out each of the functions described above may be employed to carry out embodiments of the invention. In one embodiment, all or a portion of the elements of the invention generally operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium. Additionally, it should be noted that although the preceding descriptions refer to modules, it will be understood that such term is used for convenience and thus the modules above need not be modularized, but can be integrated and code can be intermixed in any way desired.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:

training a Gaussian mixture model (GMM) using training source data and training target data;

producing a conversion function in response to the training;

determining a quality of the conversion function prior to use of the conversion function by calculating a trace measurement of the GMM; and selectively using the conversion function for feature transformation based on the trace measurement.

2. A method according to claim 1, further comprising thereafter, converting source data input into target data output using the conversion function.

3. A method according to claim 1, wherein training the GMM comprises training the GMM using training source voice data and training target voice data.

4. A method according to claim 3, further comprising an initial operation of recording the training target voice data to correspond to previously recorded training source voice data.

5. A method according to claim 1, wherein the trace measurement is calculated using the equation $Q=\int \epsilon(x)\cdot p(x)\cdot dx$.

6. A method according to claim 1, wherein the trace measurement is calculated using the approximation $$Q \approx \sum_{l=1}^{L} w_l \cdot tr(\Sigma_l^{yy}).$$

7. A method according to claim 1, further comprising comparing the trace measurement to a threshold.

8. A method according to claim 7, further comprising modifying the conversion function in response to the comparison of the trace measurement to the threshold.

9. A method according to claim 7, further comprising varying the threshold based on one or more of:

a number of mixtures;

a number of dimensions;

known statistical properties of data; and a range of data.

10. A method according to claim 1, further comprising calculating a plurality of trace measurements corresponding to a plurality of conversion functions based on corresponding different GMMs and selecting one of the conversion functions having a lowest trace measurement for use in converting the source data input into the target data output.

11. A computer program product comprising at least one computer-readable storage medium having computer-readable program code portions stored therein, the computer-readable program code portions comprising:

a first executable portion for training a Gaussian mixture model (GMM) using training source data and training target data;

a second executable portion for producing a conversion function in response to the training;

a third executable portion for determining a quality of the conversion function prior to use of the conversion function by calculating a trace measurement of the GMM; and a fourth executable portion for selectively using the conversion function for feature transformation based on the trace measurement.

12. A computer program product according to claim 11, further comprising a fifth executable portion for thereafter, converting source data input into target data output using the conversion function.

13. A computer program product according to claim 11, wherein the first executable portion includes instructions for training the GMM using training source voice data and training target voice data.

14. A computer program product according to claim 13, further comprising a fifth executable portion for performing an initial operation of recording the training target voice data to correspond to previously recorded training source voice data.

15. A computer program product according to claim 11, wherein the trace measurement is calculated using the approximation $$Q \approx \sum_{l=1}^{L} w_l \cdot tr(\Sigma_l^{yy}).$$

16. A computer program product according to claim 11, further comprising a fifth executable portion for comparing the trace measurement to a threshold.

17. A computer program product according to claim 16, wherein the fifth executable portion includes instructions for modifying the conversion function in response to the comparison of the trace measurement to the threshold.

18. A computer program product according to claim 16, wherein the fifth executable portion includes instructions for varying the threshold based on one or more of:

a number of mixtures;

a number of dimensions;

known statistical properties of data; and a range of data.

19. A computer program product according to claim 11, further comprising a fifth executable portion for calculating a plurality of trace measurements corresponding to a plurality of conversion functions based on corresponding different GMMs and selecting one of the conversion functions having a lowest trace measurement for use in converting the source data input into the target data output.

20. An apparatus comprising a processor configured to control:

a training module configured to train a Gaussian mixture model (GMM) using training source data and training target data; and a transformation module in communication with the training module, the transformation module being configured to produce a conversion function in response to the training of the GMM, wherein the training module is further configured to determine a quality of the conversion function prior to use of the conversion function by calculating a trace measurement of the GMM.

21. An apparatus according to claim 20, wherein transformation module is further configured to convert source data input into target data output using the GMM.

22. An apparatus according to claim 20, wherein training module is further configured to train the GMM using training source voice data and training target voice data.

23. An apparatus according to claim 22, wherein the training target voice data is recorded to correspond to previously recorded training source voice data.

24. An apparatus according to claim 20, wherein the trace measurement is calculated using the equation $Q=\int \epsilon(x) \cdot p(x) \cdot dx$.

25. An apparatus according to claim 20, wherein the trace measurement is calculated using the approximation $$Q \approx \sum_{l=1}^{L} w_l \cdot tr(\Sigma_l^{yy}).$$

26. An apparatus according to claim 20, wherein the training module is configured to compare the trace measurement to a threshold.

27. An apparatus according to claim 26, wherein the transformation module is configured to modify the conversion function in response to the comparison of the trace measurement to the threshold.

28. An apparatus according to claim 26, wherein the training module is configured to vary the threshold based on one or more of:

a number of mixtures;

a number of dimensions;

known statistical properties of data; and a range of data.

29. An apparatus according to claim 20, wherein the training module is further configured to calculate a plurality of trace measurements corresponding to a plurality of conversion functions based on corresponding different GMMs and selecting one of the conversion functions having a lowest trace measurement for use in converting the source data input into the target data output.

30. A mobile terminal comprising a processor configured to control:

a training module configured to train a Gaussian mixture model (GMM) using training source data and training target data; and a transformation module in communication with the training module, the transformation module being configured to produce a conversion function in response to the training of the GMM and thereafter, convert source data input into target data output using the GMM, wherein the training module is further configured to determine a quality of the conversion function prior to use of the conversion function by calculating a trace measurement of the GMM, and wherein the processor is configured to selectively use the conversion function for feature transformation based on the trace measurement.

31. A mobile terminal according to claim 30, wherein training module is further configured to train the GMM using training source voice data and training target voice data.

32. A mobile terminal according to claim 31, wherein the training target voice data is recorded to correspond to previously recorded training source voice data.

33. A mobile terminal according to claim 30, wherein the training module is configured to compare the trace measurement to a threshold.

34. A mobile terminal according to claim 30, wherein the training module is further configured to calculate a plurality of trace measurements corresponding to a plurality of conversion functions based on corresponding different GMMs and selecting one of the conversion functions having a lowest trace measurement for use in converting the source data input into the target data output.

35. An apparatus comprising:

a means for training a Gaussian mixture model (GMM) using training source data and training target data;

a means for producing a conversion function in response to the training; and a means for determining a quality of the conversion function prior to use of the conversion function by calculating a trace measurement of the GMM; and means for selectively using the conversion function for feature transformation based on the trace measurement.

36. An apparatus comprising a processor configured to:

train a Gaussian mixture model (GMM) using training source data and training target data;

produce a conversion function in response to the training;

determine a quality of the conversion function prior to use of the conversion function by calculating a trace measurement of the GMM; and selectively use the conversion function for feature transformation based on the trace measurement.

* * * * *